May 8, 1945.　　　　　E. L. SMITH　　　　　2,375,592
HELICOPTER
Filed May 16, 1942　　　　　4 Sheets-Sheet 1
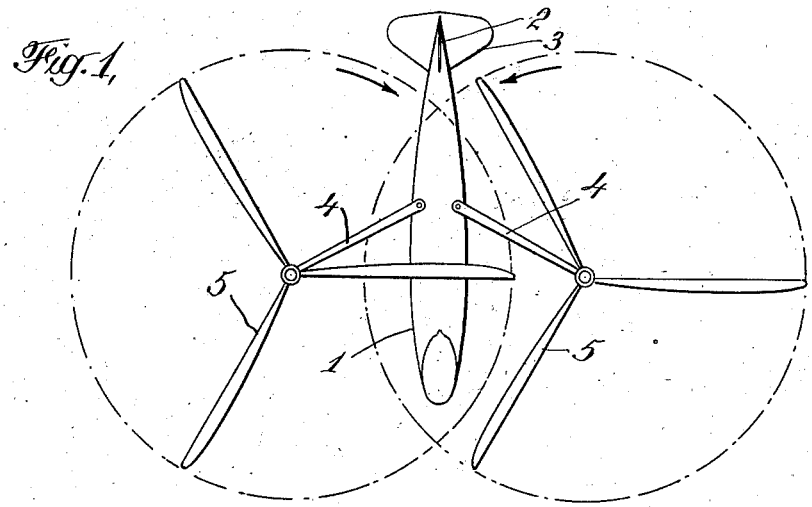
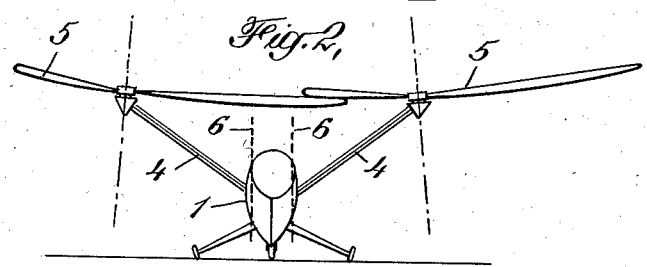
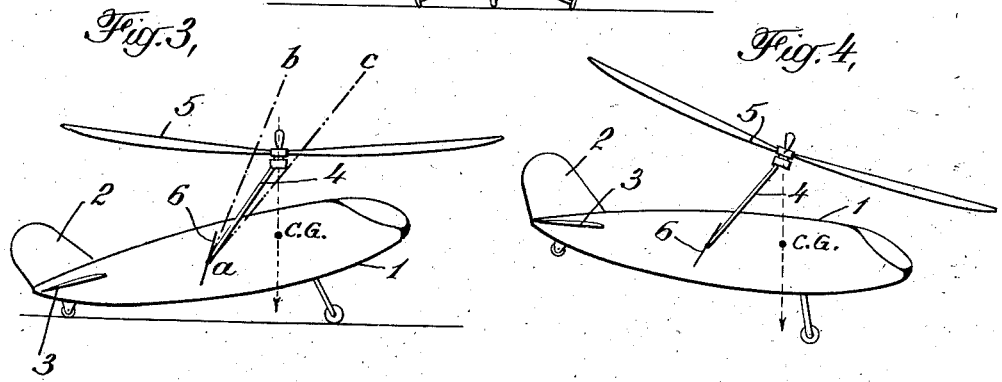
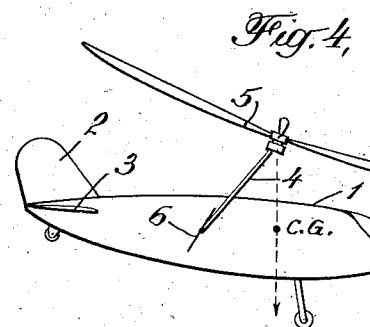
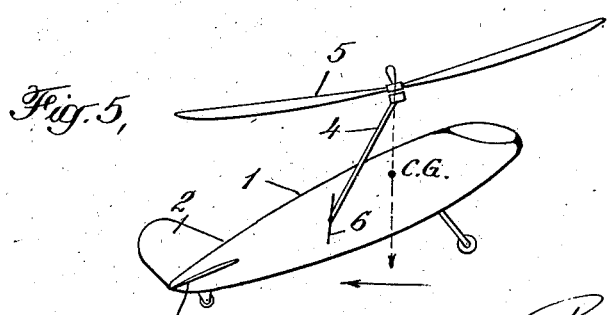
INVENTOR
Elmer L. Smith
BY
ATTORNEYS May 8, 1945. E. L. SMITH 2,375,592
HELICOPTER
Filed May 16, 1942 4 Sheets-Sheet 2
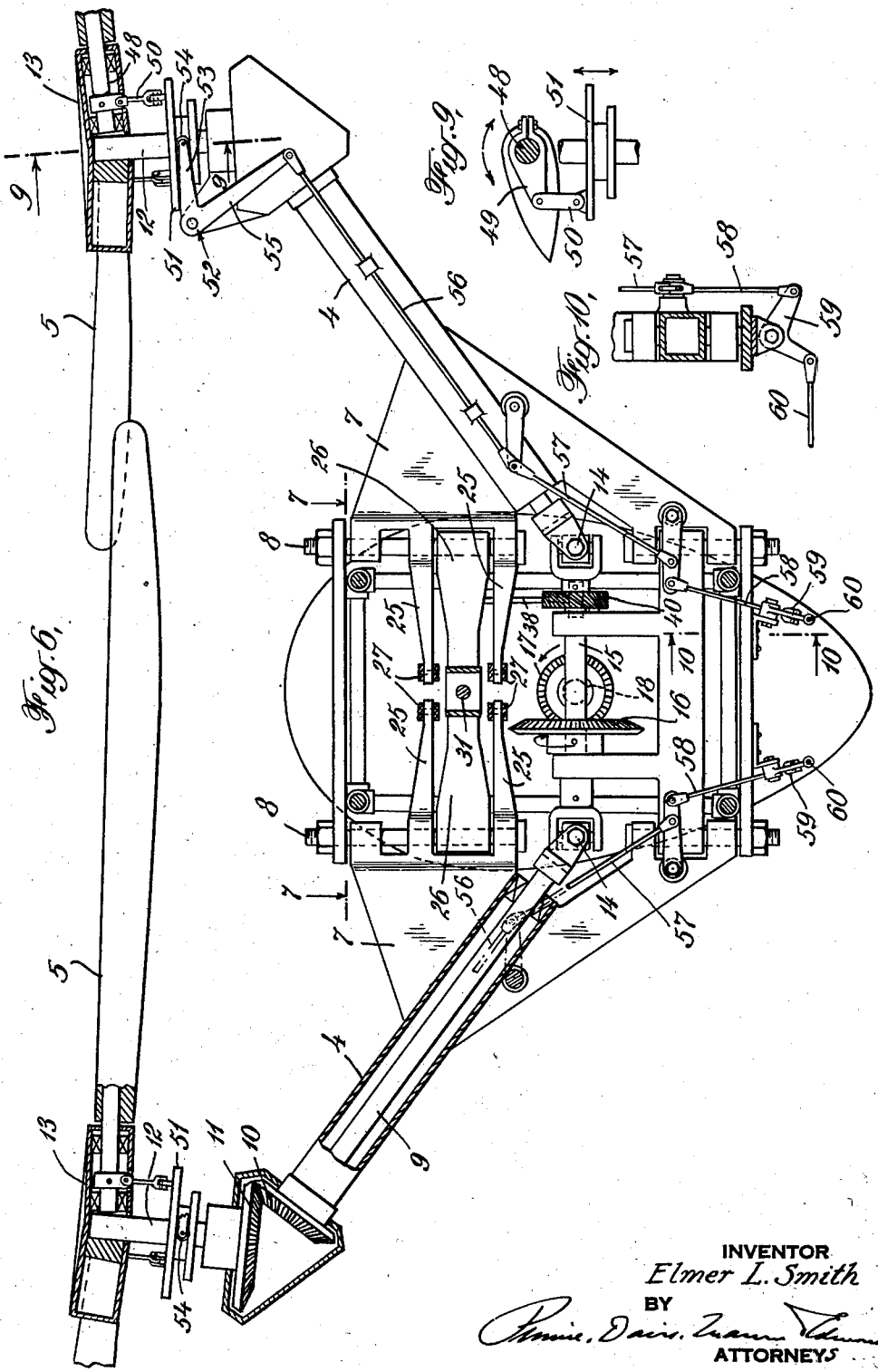
INVENTOR
Elmer L. Smith
BY
ATTORNEYS

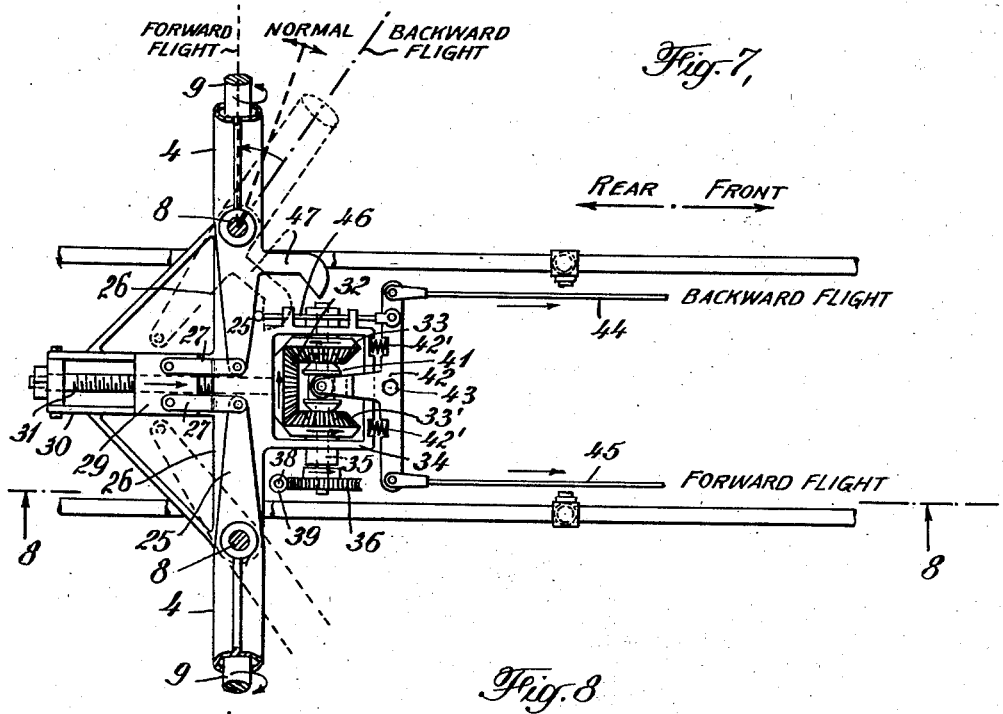
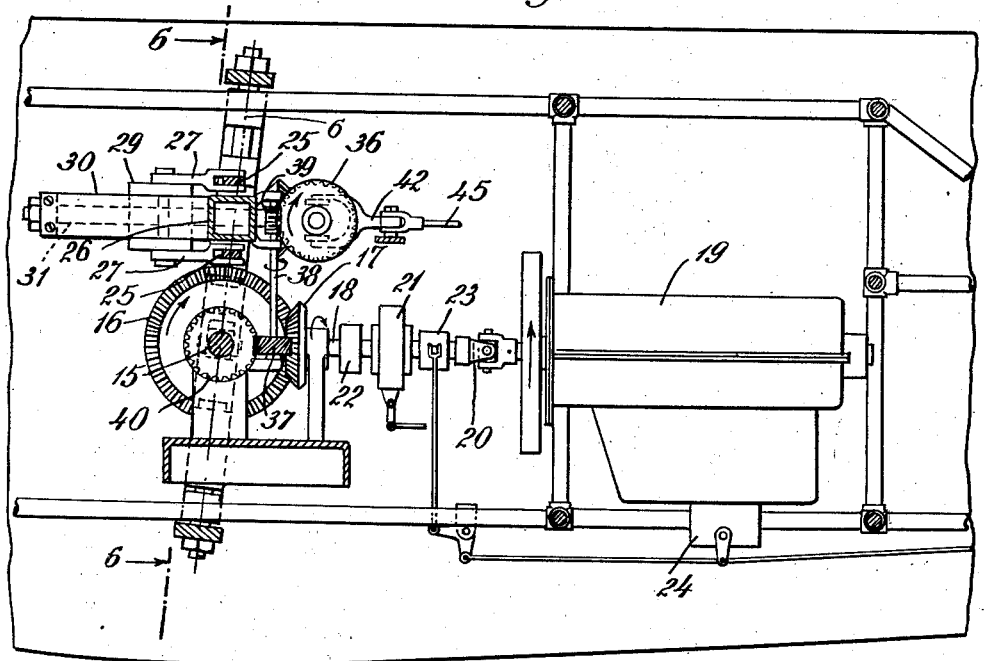

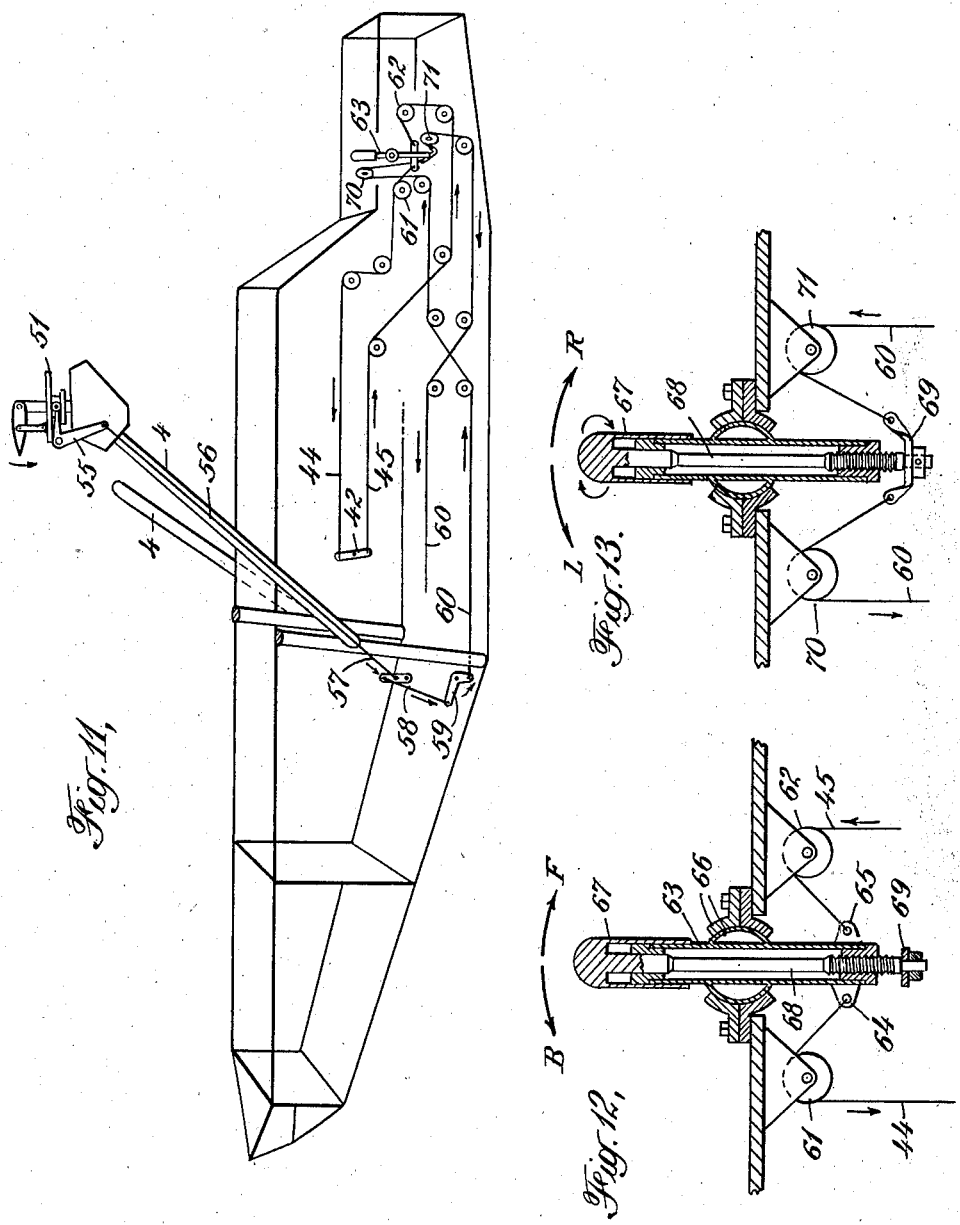

Patented May 8, 1945

2,375,592

UNITED STATES PATENT OFFICE 2,375,592

HELICOPTER

Elmer Lambertus Smith, Glen Rock, N. J.

Application May 16, 1942, Serial No. 443,185

4 Claims. (Cl. 244—17)

This invention relates to improvements in helicopters and to a new method of increasing the horizontal thrust component, or initiating such a component, in navigating them.

It has already been proposed to so construct a helicopter that a horizontal thrust component may be produced by tilting the plane of rotation of the horizontal propeller so that it has a forward declination with respect to the fuselage, i. e., by changing the angle which such plane of rotation makes with the longitudinal axis of the fuselage. It has been proposed to accomplish this by connecting the propeller mounting to the fuselage so that it can be adjusted about a horizontal axis. Such a method of producing a horizontal thrust component has a number of disadvantages. One objection is that when the propeller mounting is swung forwardly about its horizontal axis to produce the forward declination of the plane of rotation of the propeller, the center of lift of the propeller is shifted forwardly and this is accompanied by a readjustment of the attitude of the fuselage to bring the center of gravity of the helicopter back under the new center of lift. The action of the fuselage in readjusting itself is such that its forward end moves upwardly while the rear end moves downwardly, and this has the undesirable effect of returning the plane of rotation of the propeller part way back to its original position. The result is uncertainty of control, lack of stability, etc.

In accordance with this invention the horizontal thrust component is increased, or one is initiated, by shifting the center of rotation of the horizontal propeller longitudinally of the fuselage in such a way that the propeller has a movement of translation which preserves the angular relation between its plane of rotation and the fuselage. The center of rotation of the propeller is normally over the center of gravity of the helicopter. To produce a forward horizontal thrust component the propeller is translated rearwardly to shift the center of rotation of the propeller to the rear of the center of gravity while preserving the angular relationship between the plane of rotation of the propeller and the fuselage. The center of lift is thus shifted to the rear of the center of gravity and the fuselage will readjust itself to relocate the center of gravity under the new center of lift. In so doing, the forward end of the fuselage will move downwardly thus giving a forward declination to the plane of rotation of the propeller. Likewise a backward horizontal thrust component can be obtained by translating the propeller forwardly to shift the center of rotation of the propeller to a position in advance of the center of gravity of the helicopter. When the fuselage readjusts itself to relocate the center of gravity under the new center of lift the forward end of the fuselage will move upwardly thus giving a backward declination to the plane of rotation of the propeller thereby creating a backward horizontal thrust component. The degree of translation of the propeller is controllable so that the desired amount of forward or backward thrust may be obtained.

It should be understood that the use of a vertical propeller is neither required nor advisable. The horizontal thrust component is obtained solely by translation of the horizontal propeller as hereinbefore described. If a vertical propeller were employed it is quite obvious that it might produce an undesired thrust for certain attitudes of the fuselage. For instance, for a large forward declination of the plane of rotation of the horizontal propeller the fuselage might also have a forward declination in which event the vertical propeller would produce an undesired downward thrust component.

Although the invention contemplates the use of a single horizontal propeller it is preferable to employ two of them whose centers of rotation are in transverse alignment. The preferred way of obtaining the above-mentioned translatory movement of the propellers is to support them at the upper ends of arms which extend upwardly and outwardly from the fuselage and are connected at their lower ends to the fuselage to swing about pivots whose axes are vertically disposed. Since the arms swing about substantially vertical pivots their adjustment shifts the center of rotation of each propeller either forwardly or rearwardly without changing the plane of rotation of the propellers with respect to the fuselage as above described. The drive from the engine to the propellers is through the arms and power driven means are provided for simultaneously adjusting the position of the arms.

The new method of increasing the horizontal thrust component, or initiating one, and one form of helicopter embodying the invention are illustrated in the accompanying drawings in which:

Figures 1 to 5 inclusive are diagrammatic views illustrating the principles involved, Figs. 1 and 2 being plan and front views respectively of the helicopter, and Figs. 3 and 5 being side elevations thereof;

Fig. 6 is a transverse section through the helicopter looking forward, the section being taken approximately on the line 6—6 of Fig. 8;

Fig. 7 is a plan view showing a portion of one type of operating mechanism that may be employed for adjusting the position of the propeller supporting arms;

Fig. 8 is a vertical section taken on the line 8—8 of Fig. 7;

Fig. 9 is a detail sectional view taken on line 9—9 of Fig. 6;

Fig. 10 is a detail sectional view taken on line 10—10 of Fig. 6;

Fig. 11 is a diagrammatic representation of the fuselage frame work illustrating how the mechanism for adjusting the propeller supporting arms, and certain mechanism for changing the pitch angle of the propeller blades, may be controlled from the joy stick;

Fig. 12 is a longitudinal section through the joy stick; and

Fig. 13 is a transverse section through the joy stick.

Referring first to Figs. 1 to 5, the helicopter comprises a fuselage 1 preferably of the streamline type. It may have a vertical fin 2 and an adjustable stabilizer 3. A rudder and elevator may be provided if desired, but as will hereinafter appear, they are not essential.

The propeller supporting arms hereinbefore referred to are indicated at 4. As best shown in Fig. 2 they extend upwardly and outwardly from the fuselage. Mounted on the upper end of each arm 4 is a propeller 5. These propellers are referred to as horizontal propellers, not because they necessarily rotate in a true horizontal plane, but to distinguish them from the usual vertical propeller employed at the forward end of an aeroplane to produce forward motion.

As best shown in Fig. 2 each propeller may be dished somewhat and its axis of rotation is slightly inclined, as viewed from the front or the rear, so that the two axes converge toward some point above the fuselage. This arrangement causes the propellers to form a dihedral, and the blades when moving along the inner portion of their orbits will lie in a substantially horizontal plane, as shown in Fig. 2. The propellers are driven in the direction indicated by the arrows in Fig. 1.

Each of the arms 4 is hinged to the fuselage in such manner that it may swing about an axis 6 which is vertically disposed when the helicopter is on the ground, as indicated in Fig. 3. It is apparent that with this type of connection each arm 4 may be swung back and forth about its axis 6 without changing the angular relation between the plane of rotation of the propeller and the fuselage. The axis 6 is characterized as "vertically disposed" even though it may not be strictly vertical, to distinguish from a horizontal axis which would cause the unwanted change in angular relationship between the plane of rotation of the propeller and the fuselage when the propeller supporting arm is swung about the axis.

The mounting of the propellers is such that normally the centers of rotation of the propellers and the center of gravity of the helicopter lie substantially in the same vertical plane. For instance, when the helicopter is on the ground, as represented in Fig. 3, the center of gravity represented, for example, at C G lies substantially in the vertical plane passing through the two centers of rotation of the propellers. Thus the center of gravity lies substantially under each center of rotation of the propellers. Moreover, when the helicopter is on the ground the axis of rotation of each propeller, as viewed from the side of the helicopter, is substantially vertical. In the position of the parts shown in Fig. 3 the propellers would produce only a vertical thrust. To obtain a forward thrust component the arms 4 are simultaneously shifted rearwardly by any suitable mechanism, such as that hereinafter described, say to the position indicated by the broken line a—b in Fig. 3. This shifts the center of lift of each propeller to the rear of the center of gravity, whereupon the fuselage shifts its position, as indicated in Fig. 4 to re-locate the center of gravity under the new centers of lift. When the fuselage readjusts its position its forward end moves downwardly and this, of course, shifts the plane of rotation of the propellers until they have a forward declination. There will then be a forward thrust component which will impart forward movement to the helicopter. Similarly if the arms 4 are moved forwardly, say to the position represented by the broken line a—c in Fig. 3, the center of gravity will re-locate itself under the new centers of lift and in so doing will cause the forward end of the fuselage to move upwardly as indicated in Fig. 5 to give a rearward declination to the propellers. This will produce a backward thrust component.

Fig. 6 shows one way in which the propeller supporting arms 4 may be hinged to the fuselage, and one way in which the propellers may be mounted on the arms and driven through them. The arms 4 may be hollow tubes, as indicated in the drawings. Each of them may be secured at its lower end to a hinge member 7 which is pivotally connected to the fuselage frame by means of a bolt 8. The bolts 8 correspond to the axes 6 in Figs. 1 to 5 about which the propeller supporting arms swing.

Each propeller may be driven by a shaft 9 extending through the arm 4. At its upper end this shaft drives, through the bevel gears 10 and 11, the shaft 12 to which is connected the propeller hub 13. The lower ends of the shafts 9 are operatively connected to a transverse connecting shaft 15 from which the two shafts 9 are driven. By way of example, universal joints 14 are shown in the drawings for driving the shafts 9 from the connecting shaft 15, but it should be understood that a suitable system of gears capable of driving the shafts 9 in any position of the arms 4 may and probably would be used in practice in place of the universal joints 14. The shaft 15 carries a bevel gear 16 which is driven from a bevel gear 17 on the engine shaft 18 extending longitudinally of the fuselage. The shaft 18 is driven from the engine 19 (Fig. 8), through a universal joint 20. In addition to the usual parts, such as the clutch 21 and free wheeling mechanism 22, there is preferably provided a governor represented diagrammatically at 23 suitably connected to the carburetor 24 of the engine so that the engine speed is normally maintained constant.

The universal joints 14 at the lower ends of the shafts 9 are centered in the axes of rotation of the arms so that swinging of the arms back and forth does not interfere with driving the propellers through the arms.

The propeller supporting arms may be moved back and forth in unison by any suitable means whether of the hydraulic, pneumatic, or purely mechanical type. A mechanical system for accomplishing this has been shown in the drawings by way of example. As best shown in Fig. 6 each hinge member 7 has two inwardly extending arms 25, one located above a cross-member 26, rigidly attached to the fuselage frame, and the other located below this cross-member. The inner ends of the arms 25 are connected by links 27 (see also Figs. 7 and 8) to a block 29. This block is adapted to slide back and forth in a guide frame 30 rigidly attached to the cross-member 26. A threaded shaft 31 passes through and co-operates with the block 29. This shaft extends forwardly through the cross-member 26 and carries at its forward end a bevel gear 32 (Fig. 7). The gear 32 constantly meshes with two bevel gears 33 and 33' mounted in a gear box 34. The gears 33 and 33' are loose on a transverse shaft 35 which is constantly rotated from the shaft 15 through a vertical shaft 38. This vertical shaft may be driven from shaft 15 through helical gears 40 and 37 (Figs. 6 and 8) and may drive the shaft 35 through worm 39 and worm wheel 36 (Figs. 7 and 8). Either of the bevel gears 33 and 33' may be operatively connected to the shaft 35 by means of a clutch member 41 which is keyed to slide on this shaft. The clutch member 41 may be moved back and forth into and out of engagement with the gears 33 and 33', and to a neutral position, by means of a rocker arm 42 mounted to swing about a vertical pivot 43. The rocker arm is actuated by cables 44 and 45 which extend to and are connected with the control stick as hereinafter described. If the cable 45 is pulled to move the rocker arm 42 to a position in which the bevel gear 33' is operatively connected with the shaft 35, the bevel gear 32 will be rotated in a direction to move the sliding block 29 forwardly. This motion of the sliding block will actuate the hinge members 7, through the links 27, to move the propeller supporting arms to the position represented in full lines in Fig. 7, in other words, to their rearward position. This will cause forward flight of the helicopter as hereinbefore explained. Likewise the propeller supporting arms may be moved to their forward position, indicated by the dotted lines in Fig. 7, by pulling on the cable 44 to thereby connect the bevel gear 33 with the shaft 35. The rocker arm 42 is normally biased to its neutral position by means of springs 42'.

As the propeller supporting arms 4 approach the limit of their rearward movement (to produce forward flight) they engage a rod 46 which is connected to the rocker arm 42 and thereby move the rocker arm back towards its neutral position to disconnect the gear 33' from the shaft 35. Thus the movement of the arms 4 is automatically arrested when they reach the predetermined limit of their movement. Similarly as the arms 4 approach the end of their forward movement (to produce backward flight) a projecting member 47 on one of the hinge members engages a portion of the rod 46 to disengage the clutch member 41 from the bevel gear 33. The automatic disconnection of the power drive for swinging the arms 4 when they approach either limit of their movement, as just described, is to prevent jamming of the parts, but it should be understood that the mechanism is under the control of the pilot so that he can stop the movement of the arms after they have moved any desired amount in either direction.

The propeller blades on each propeller are preferably variable in pitch and any desired means may be provided for changing their pitch angle. One way of accomplishing this is illustrated by way of example in the drawings. Referring to Fig. 6 it will be noted that the shaft 48 of each propeller blade is rotatably mounted in the hub 13 so that the blade may be adjusted about its own axis. Each of the propeller blade shafts 48 has attached to it an arm 49 (Fig. 9) which is connected by means of a link 50 to a grooved sleeve 51. This sleeve is keyed to the hub shaft 12 of the propeller so that it rotates therewith but is vertically slidable thereon. A bell crank lever 52 is pivoted to the casing at the upper end of the arm, and one arm 53 of the bell crank lever carries a roller 54 which operates in the groove of the sleeve 51. The other arm 55 of the bell crank lever is adapted to be actuated by a system of rods 56, 57 and 58 extending down the arm 4, and down the hinge member 7, to the lower part of the fuselage where the rod 58 is connected to one arm of a bell crank lever 59 (see also Fig. 10). The other arm of this bell crank lever is connected to a cable 60 which extends to the control stick. It will be understood that this mechanism is duplicated for the other propeller. If the cable 60 at one side of the fuselage is pulled, the motion will be transmitted through the rods 58, 57 and 56 to the bell crank lever 52 which will move the sleeve 51 downwardly and thus simultaneously increase the pitch angle of all of the blades of the propeller. If the cable 60 is released the propeller blades will be turned by the wind pressure in a direction to lessen their pitch angle.

Figs. 11 to 13 illustrate how the mechanism for swinging the propeller supporting arms, and the mechanism for varying the pitch angle of the propeller blades, can be controlled from the control stick. The rocker arm 42, shown in Fig. 7, for shifting the clutch member 41 is reproduced diagrammatically in Fig. 11. This figure shows that the cables 44 and 45, connected to the rocker arm, are guided by various pulleys, until they reach two pulleys 61 and 62 (Fig. 12) located near the control stick 63. The cables 44 and 45 pass over the pulleys 61 and 62 and are connected at 64 and 65 to the lower end of the control stick 63. The control stick is supported intermediate its upper and lower ends in a universal mounting 66. By moving the handle 67 of the control stick backward and forward, as indicated by the arrows in Fig. 12, the cables 44 and 45 may be actuated to shift the rocker arm 42 as above described.

The universal mounting of the control stick also permits its handle to be moved laterally and this motion is employed to actuate the cables 60 which vary the pitch angle of the propeller blades. As best shown in Fig. 13 the control stick has a central shaft 68 which has threaded engagement at its lower portion with the lower end of the stick casing. The lower end of shaft 68 passes loosely through a yoke 69 in such manner that the shaft may turn in the yoke. The cables 60 pass over pulleys 70 and 71 near the control stick and pass to the control stick in a plane at right angles to the plane in which the cables 44 and 45 pass to the control stick. The cables 60 are connected to opposite sides of the yoke 69 so that lateral shifting of the control stick, i. e., movement of the control stick to the right or left, will pull on one of the cables 60 and release the other and thereby increase the pitch angle of the blades of one propeller and decrease the pitch angle of the blades of the other propeller thus varying the balance of lift in such a way that the craft will glide and turn to the right or left respectively as described hereinafter.

The shaft 68 in the control stick is connected to the handle 67 and they are both rotatable about the axis of the shaft 68. By rotating the handle of the control stick the shaft 68 and the yoke 69 are moved vertically. This either pulls simultaneously on both cables 60 or simultaneously releases both of them to adjust the pitch angle of the blades of both propellers in the same direction.

A number of things can be accomplished by actuating the control stick. Forward or backward movement of it will cause the propeller supporting arms to start moving either forwardly or rearwardly until the control stick is returned toward its neutral position. For instance, as long as the control stick is held in the forward position the propeller supporting arms will continue to swing backwardly, steadily dropping the nose of the fuselage and therefore steadily increasing the angle of forward declination of the propellers and gradually increasing the forward thrust component of the propellers. Thus forward or backward motion of the helicopter results by moving the control stick forwardly or backwardly respectively.

Lateral movement of the control stick will increase the pitch angle of the blades on one propeller, while decreasing the pitch angle of the blades on the other propeller. The propellers whose blades have had their pitch angle increased will then exert the greater lift. The helicopter can in this way be made to tilt to either side thus giving a lateral declination to the plane of rotation of the propellers which will cause a sideward movement of the helicopter. For example, if the pilot moves the control stick to his right the pitch angle of the blades of the left-hand propeller is increased and the pitch angle of the blades of the right-hand propeller is decreased. Since the R. P. M. of the engine is held substantially constant by the governor hereinbefore referred to, the left-hand propeller will exert a greater lifting force than the right-hand propeller and the helicopter will shift to the right. Similarly by moving the stick to the left the craft will shift to the left. Moreover, as the stick is moved to the right or left, the left or right propeller respectively has the major portion of the torque (due to increased drag caused by increased pitch angle of its blades) and as a result of the direction of rotation of the propellers, indicated in Fig. 1, the counter-torque will turn the fuselage to the right or left respectively.

By turning the handle of the control stick to increase the pitch angle of the blades of both propellers or decrease the pitch angle of the blades of both propellers the helicopter can be made to rise or descend. Direct vertical ascent may be attained by driving the propellers rapidly with the blades of both propellers set at zero degrees pitch angle. This will store up a great deal of kinetic energy, which is used in lifting the helicopter when simultaneously full power is turned on and the blades are turned to some optimum positive pitch angle. Hovering and descending are also controlled by adjusting the pitch angle of the blades of both propellers in the same direction, it being understood that the engine furnishes sufficient power and that the engine speed is normally controlled by a governor.

Of course, a translatable steering wheel could be used instead of the control stick and could be connected to the various cables to actuate them in the same way as described above, as will be well understood by those familiar with this art.

A helicopter constructed in accordance with the invention has many advantages. With the use of two horizontal propellers and no vertical propeller, and without other conventional controls, such as ailerons, an elevator or a rudder, it may be made to move either forwardly or backwardly or sideways; it may be turned to the right or left; it may be made to ascend and descend vertically or gradually; and it may be made to hover. It has several times the forward speed of the average aeroplane because the propellers work on increasing undisturbed air thus causing them to be more and more efficient as the change of air is increased. It is aerodynamically stable especially in that it will not tail spin and the control mechanism is simple and easy to operate.

I claim:

1. A helicopter comprising a fuselage, a pair of arms extending outwardly and upwardly from the fuselage, each of said arms being pivoted to the fuselage to swing about a vertically disposed axis, a horizontal propeller mounted on each arm, the propellers being so located that the centers of lift are normally substantially over the center of gravity of the helicopter, said propellers constituting the sole thrust producing means for all directions of travel, a motor, means for driving the propellers from the motor, said arms being capable of a swinging movement such as to allow movement of the center of rotation of each propeller to the rear of the center of gravity of the helicopter, and means for simultaneously swinging said arms whereby the center of lift of each propeller may be moved rearwardly to cause the center of gravity of the helicopter to re-locate itself under the new centers of lift and in so doing move the forward end of the fuselage downwardly thus tilting the plane of rotation of the propellers in a direction such that a forward thrust component is produced or increased.

2. A helicopter comprising a fuselage, a pair of arms extending outwardly and upwardly from the fuselage, each of said arms being pivoted to the fuselage to swing about a vertically disposed axis, a horizontal propeller mounted on each arm, the propellers being so located that the centers of lift are normally substantially over the center of gravity of the helicopter, said propellers constituting the sole thrust producing means for all directions of travel, a motor, means for driving the propellers from the motor, said arms being capable of a swinging movement wide enough to move the center of rotation of each propeller either to the rear of the center of gravity of the helicopter or in advance thereof, and means for simultaneously swinging said arms whereby the center of lift of each propeller may be moved either to the rear or in advance of the center of gravity of the helicopter to cause the center of gravity to re-locate itself under the new centers of lift and in so doing either move the forward end of the fuselage downwardly thus tilting the plane of rotation of the propellers in a direction such that a forward thrust component is produced or increased or move the rear end of the fuselage downwardly thus tilting the plane of rotation of the propellers in a direction such that a backward thrust component is produced or increased.

3. A helicopter comprising a fuselage, a pair of arms extending outwardly and upwardly from the fuselage, each of said arms being pivoted to the fuselage to swing about a vertically disposed axis, a horizontal propeller mounted on each arm to rotate about an axis so disposed that when the helicopter is on the ground such axis is substantially vertical when viewed from the side and is substantially over the center of gravity of the helicopter, said propellers constituting the sole thrust producing means for all directions of travel, a motor, means for driving the propellers from the motor, said arms being capable of a swinging movement such as to allow movement of the center of rotation of each propeller to the rear of the center of gravity of the helicopter, and means for simultaneously swinging said arms whereby the center of lift of each propeller may be moved rearwardly to cause the center of gravity of the helicopter to re-locate itself under the new centers of lift and in so doing move the forward end of the fuselage downwardly thus tilting the plane of rotation of the propellers in a direction such that a forward thrust component is produced or increased.

4. A helicopter comprising a fuselage, a pair of arms extending outwardly and upwardly from the fuselage, each of said arms being pivoted to the fuselage to swing about a vertically disposed axis, a horizontal propeller mounted on each arm to rotate about an axis so disposed that when the helicopter is on the ground such axis is substantially vertical when viewed from the side and is substantially over the center of gravity of the helicopter, said propellers constituting the sole thrust producing means for all directions of travel, a motor, means for driving the propellers from the motor, said arms being capable of a swinging movement wide enough to move the center of rotation of each propeller either to the rear of the center of gravity of the helicopter or in advance thereof, and means for simultaneously swinging said arms whereby the center of lift of each propeller may be moved either to the rear or in advance of the center of gravity of the helicopter to cause the center of gravity to re-locate itself under the new centers of lift and in so doing either move the forward end of the fuselage downwardly thus tilting the plane of rotation of the propellers in a direction such that a forward thrust component is produced or increased or move the rear end of the fuselage downwardly thus tilting the plane of rotation of the propellers in a direction such that a backward thrust component is produced or increased.

ELMER LAMBERTUS SMITH.